(12) United States Patent
Kříž

(10) Patent No.: US 10,505,739 B2
(45) Date of Patent: Dec. 10, 2019

(54) PREFIX FINGERPRINT

(71) Applicant: Avast Software s.r.o., Prague (CZ)

(72) Inventor: Antonín Kříž, Prachatice (CZ)

(73) Assignee: AVAST SOFTWARE S.R.O., Prague (CZ)

(*) Notice: Subject to any disclaimer, the term of this patent is extended or adjusted under 35 U.S.C. 154(b) by 309 days.

(21) Appl. No.: 15/624,544

(22) Filed: Jun. 15, 2017

(65) Prior Publication Data

US 2017/0373856 A1 Dec. 28, 2017

Related U.S. Application Data

(60) Provisional application No. 62/355,750, filed on Jun. 28, 2016.

(51) Int. Cl.
*H04L 29/06* (2006.01)
*H04L 9/32* (2006.01)
*H04L 9/06* (2006.01)

(52) U.S. Cl.
CPC .......... *H04L 9/3242* (2013.01); *H04L 9/0643* (2013.01); *H04L 9/3247* (2013.01); *H04L 63/10* (2013.01)

(58) Field of Classification Search
CPC .............................. H04L 9/0643; H04L 63/10
See application file for complete search history.

(56) References Cited

U.S. PATENT DOCUMENTS

| | | | |
|---|---|---|---|
| 4,309,569 A | 1/1982 | Merkle | |
| 2003/0120647 A1* | 6/2003 | Aiken | G06F 16/951 |
| 2007/0130188 A1* | 6/2007 | Moon | G06F 21/64 |

OTHER PUBLICATIONS

Trie, https://en.wikipedia.org/wiki/Trie, 9 pages. Accessed Sep. 16, 2017.
Merkle tree, https://en.wikipedia.org/wiki/Merkle_tree, 5 pages. Accessed Sep. 16, 2017.

* cited by examiner

*Primary Examiner* — Dao Q Ho
(74) *Attorney, Agent, or Firm* — Husch Blackwell LLP

(57) ABSTRACT

A system and method for prefix fingerprints for a first file or a first data object. A prefix fingerprint comprises a plurality of hash values. The hash values of the prefix fingerprints are typically generated starting at the same offset within the file or data object, but are generated based on different data sizes. Later, a second file or second data object can be compared with the first file or first data object to determine if the second file or data object is a prefix of the first file or data object. A hash value is selected from the previously determined prefix fingerprint of the first file based on the size of the second file. A hash is generated for the second file using the same offset value and size as was used to generate the selected hash value from the prefix fingerprint. The hash values are then compared.

5 Claims, 6 Drawing Sheets

PREFIX FINGERPRINT

CROSS-REFERENCE TO RELATED APPLICATIONS

This application claims priority to U.S. Provisional Patent Application Ser. No. 62/355,750, filed on Jun. 28, 2016, entitled "Prefix Fingerprint,", the entire disclosure of which is incorporated herein by reference.

FIELD OF INVENTION

The present invention relates generally to computing systems, and more particularly, to determining a prefix fingerprint for files and data management.

BACKGROUND OF THE INVENTION

Files are regularly downloaded or transferred to and from computing devices via the internet and other computer networks. When a file or data object is received by a computing devices, hashing has been employed to find a file or data object using a short hash key, to determine whether or not a file or data object has been previously downloaded and is already on the computing device, whether or not a file or data object has become corrupted in transit, and purposes of encryption. Techniques that have been employed through a determination algorithm for file or data array management include Message Digital Algorithm 5 (MD5) or Secure Hash Algorithm (SHA). However, these conventional algorithms have been known for reducing speed performance without identifying entire data files. There are many occasions where it is desirable to determine if one file is a prefix of another file or if one data object is a prefix of another data object. For applying faster performance in data file checking process, advanced compute signatures (i.e., new fingerprint) are needed to resolve the limitations associated with the existing.

SUMMARY OF THE INVENTION

The present invention relates to a prefix fingerprint. A first embodiment of the invention provides a method including a step for determining whether to compare a first file and a second file. A plurality of hash values which may be associated with a first prefix fingerprint for the first file generated from a fingerprint generator, wherein the plurality of hash values are based on a plurality of data sections of the first file. The method may include selecting a first hash value from the first prefix fingerprint based on a size of the second file. Each hash value in the prefix fingerprint can be calculated from the same beginning offset. The first beginning offset is zero. Subsequently, in generating a second hash value for the second file, the second hash value can be based on a data section of the second file, wherein the data section of the second file has a second beginning offset and same data size as used to generate the first hash value in the first prefix fingerprint. A determination procedure may be executed, wherein through a comparison of the hash value basis which represent the first and second hash value, it can be determined whether the second file is prefix of the first file.

In one embodiment, the method further includes performing a fingerprint dataset configured to store a first prefix fingerprint communicably coupled with a computing device, such as laptop computer, tablet computer, smart phone, smart media player (e.g., set top box or other display application), or any other device having one or more processors and memories. The fingerprint dataset has a file identifier (ID) that identifies a file associated with the prefix fingerprint. The prefix fingerprint has one or more hash values covering different sizes of data in the first file.

A second embodiment of the invention provides a system that includes a computing device and a fingerprint dataset associate with a network, a corporate intranet, or an internet interface. The computing device includes one or more embodiments of a processor configured to select files or data objects, a memory configured to store data associated with computer executable instruction, a generator configured to generate a prefix fingerprint for the file or data object, and a comparison unit configured to compare the first file or first data object and a second file or second data object. The comparison unit can include a fingerprint generator. The fingerprint dataset, configured to store the prefix fingerprint communicably coupled with the computing device via the network or internet interface, includes one or more embodiments of a file identifier (ID) identifying a file path, name, or location, and a hash table comprised with the prefix fingerprint having hash values covering different sizes of data in the file or data object.

A further embodiment of the present invention provides a non-transitory computer readable storage medium having a program for generating a prefix fingerprint for the first file and making a determination based on comparison of the first hash value to the second hash value. The program may be made available as a program product comprising program code recorded on computer readable storage medium.

Embodiments of the present invention enable the improvement of processor performance through optimized file or data object management by a determining and comparison procedure. Further embodiments and advantages of the invention are described in the detailed description below.

DESCRIPTION OF THE SEVERAL VIEWS OF THE DRAWINGS

For a better understanding of the disclosure, reference may be made to the accompanying drawings in which.

DETAILED DESCRIPTION OF THE INVENTION

Figure 1:
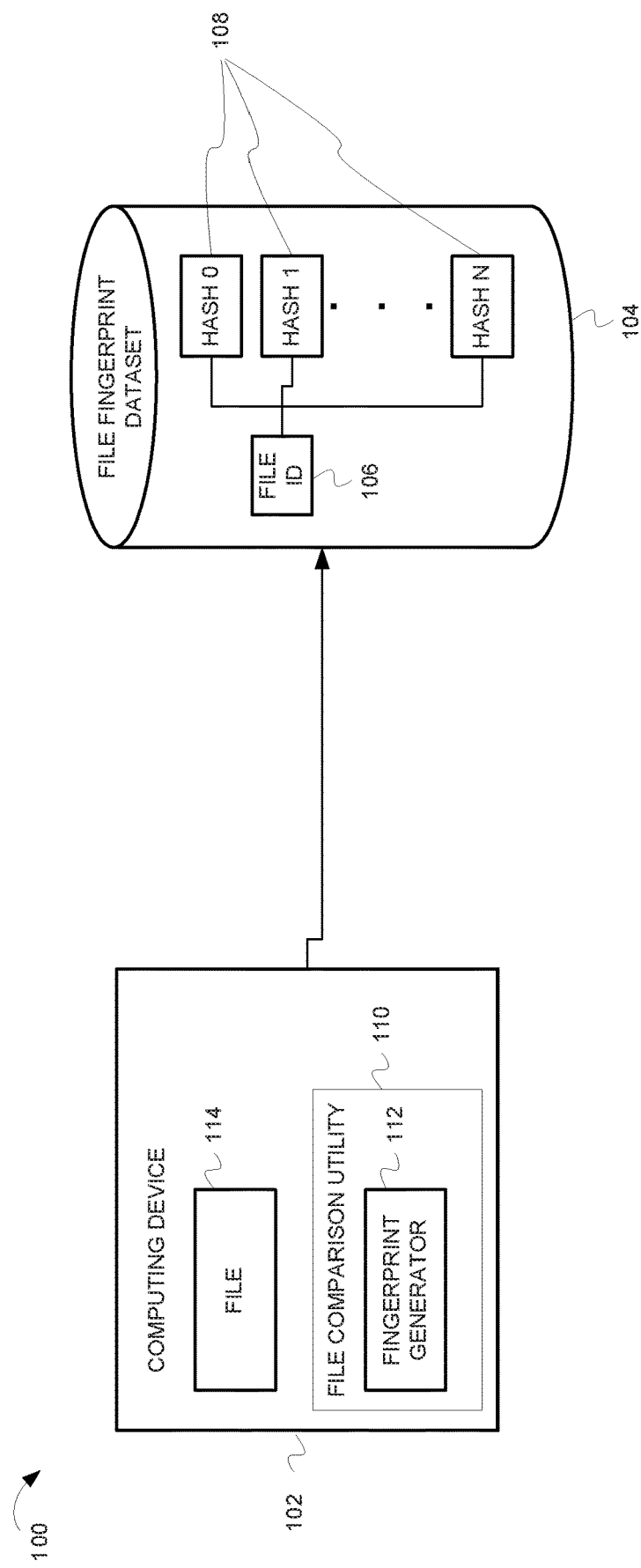
FIG. 1 is a block diagram illustrating an example system for determining prefix fingerprints according to one embodiment of the present invention.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

In various aspects of the disclosure, prefix fingerprints are generated for a first file or a first data object. The prefix fingerprints are typically generated starting at the same offset within the file or data object, but are generated based on different data sizes. Later, a second file or second data object can be compared with the first file or first data object to determine whether the second file or data object is a prefix of the first file or data object.

FIG. 1 is a block diagram illustrating an example system 100 for determining prefix fingerprints according to embodiments. In some embodiments, system 100 includes a computing device 102 communicably coupled to a file fingerprint dataset 104. Computing device 102 may be coupled to file fingerprint dataset 104 via a bus, a wired network, a wireless network, or any combination thereof. Any of the wired or wireless networks may be a local area network, a metropolitan area network, a wide area network, a corporate intranet, or the Internet.

Computing device 102 can be a desktop computer, laptop computer, tablet computer, smart phone, personal digital assistant, media player, set top box, or any other device having one or more processors and memory for executing computer programs. The embodiments are not limited to any particular type of computing device. Computing device 102 can include a file comparison unit 110. File comparison unit 110 can include one or more of software, firmware or other programmable logic that can be configured to compare some or all of a file with some or all of one or more other files. Additionally, file comparison unit 110 may include a fingerprint generator 112 that can generate a prefix fingerprint for one or more files as further described below.

The fingerprint dataset 104 can be configured to store prefix fingerprints that are generated for files by computing device 102 or other computing devices and can be stored in the file fingerprint dataset 104. For an instruction execution, one or more processor associated with the fingerprint dataset may be employed. File fingerprint dataset 104 can be a database (e.g., a relational database) or other data structure (e.g., a graph, tree, linked list etc.) that can store prefix fingerprints. A prefix fingerprint 108 can be associated with a file via a file identifier 106 that identifies a file. For example, a file identifier 106 can be a file path and file name, or other unique identifier for a file. A prefix fingerprint 108 comprises one or more hash values (e.g., 0, 1, 2, 3 . . . N) that are generated for the associated file in the manner described below.

Figure 2:
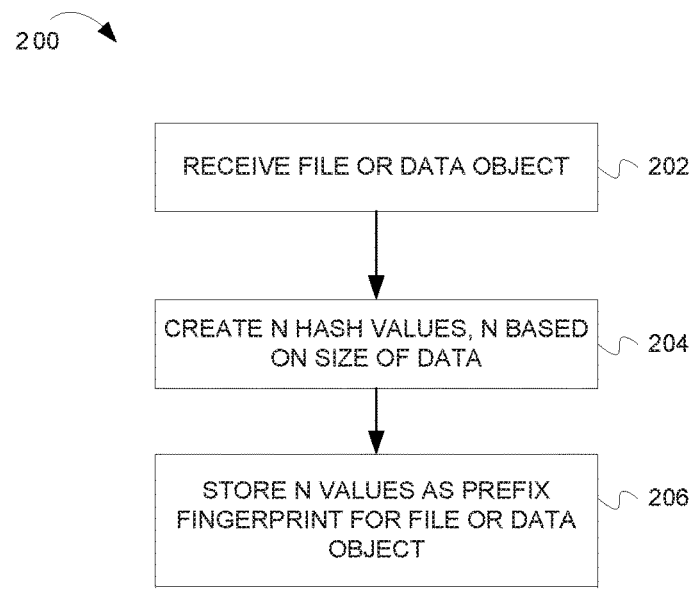
FIG. 2 is a flow chart illustrating operations of a method for determining a prefix fingerprint according to one embodiment of the present invention.

FIG. 2 is a flow chart 200 illustrating operations of a method for determining a prefix fingerprint according to one embodiment of the present invention. At block 202, a fingerprint generator 112 receives a file or data object.

At block 204, the fingerprint generator 112, generates a prefix fingerprint for the file or data object. In some aspects, the prefix fingerprint comprises one or more hash values. The number of hash values in the prefix fingerprint for the file or data object can depend on the size of the file or data object. Each hash value covers a different size of data in the file or data object. Each hash value in the prefix fingerprint is calculated from the same beginning offset into the file or data object. In some aspects, the beginning offset can be the beginning of the file or data object (e.g., the beginning offset can be zero). A first hash value is generated for a first portion of the file or data object. Successive hash values can be generated, with the size of the data used for generating the hash value increasing for each hash value that is generated. Any strong or cryptographic method of generating a hash value can be used to generate the hash values for a prefix fingerprint.

At block 206, the hash values that are generated for the file or data object can be optionally stored as the prefix fingerprint for the file or data object in the fingerprint dataset 104.

Figure 3:
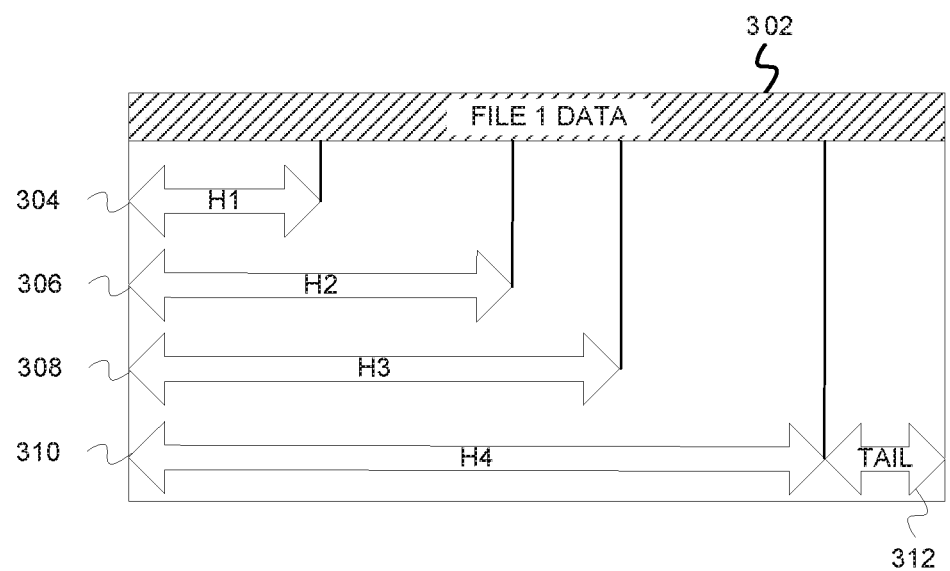
FIG. 3 provides example prefix fingerprints for files of various sizes.
Figure 3:
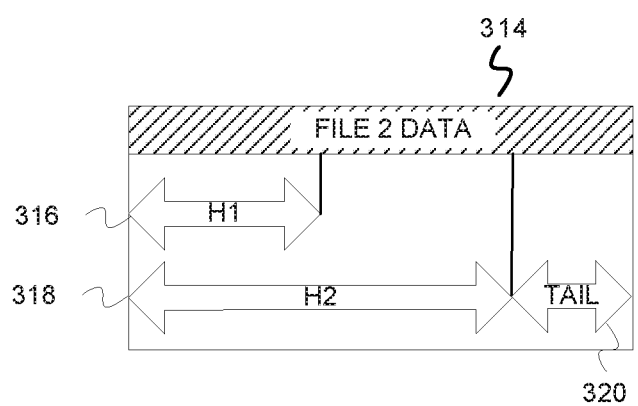

FIG. 3 provides example prefix fingerprints for two files of different sizes. In the example illustrated in FIG. 3, a first file 302 has a prefix fingerprint consisting of four hash values 304-310. Each of the hash values 304-310 is computed from data that starts at offset zero in the file data. The size of the data that is the basis for the hash value increases for each successive fingerprint. For example, the size of the data used to generate hash value 306 is larger than that used to generate hash value 304, hash value 308 is generated using a larger data size than hash value 306, and hash value 310 uses the largest data size in the example fingerprint. A tail portion 312 is not used to generate any hash values. The size of the tail portion 312 can be used to determine a precision of the prefix fingerprint as will be described below.

A prefix fingerprint for a second file 314 is also illustrated in FIG. 3. The size of the file 314 is smaller than file 302. Thus, the prefix fingerprint contains fewer hash values (e.g., hash values 316 and 318) than that of the prefix fingerprint for file 302. As with file 302, the hash values 316 and 318 begin at offset zero of file 314. Further, the sizes of the data used to generate hash value 316 and 318 are the same as those of the corresponding hash values 304 and 306 for file 302. In other words, a hash value H1 304 of file 302 starts at the same point in the file and covers the same amount of data as hash value H1 316 of file 314. Similarly, a hash value H2 306 of file 302 starts at the same point and covers the same amount of data as hash value H2 318 of file 314. File 314 also contains a tail portion 320 that is not used to generate a hash value.

Figure 4:
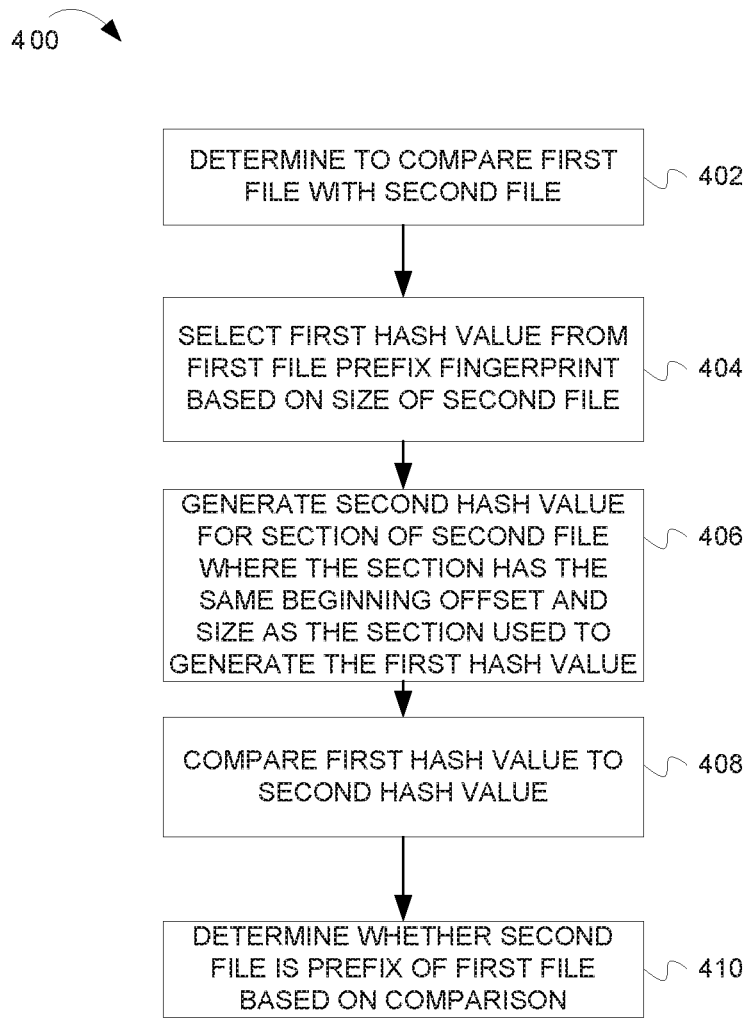
FIG. 4 is a flow chart illustrating operations of a method for determining a prefix fingerprint according to one embodiment of the present invention.

FIG. 4 is a flow chart illustrating operations of a method for comparing files using a prefix fingerprint according to embodiments. At block 402, a determination is made to compare a first file with a second file. The first file may have a prefix fingerprint already generated for the file.

At block 404, a hash value is selected from one of the hash values that make up the prefix fingerprint for the first file. The hash value is selected based on the size of the second file. For example, a hash value $H_1$ is select based on a data size for the hash value such that the data size used to generate $H_i$ is less than or equal the size of the second file, and the data size used to generate $H_{i+1}$ is larger than the size of the second file.

At block 406, a hash value is generated for a section of the second file. The hash value is generated using the same beginning offset and same data size as was used to generate $H_i$.

The block 408, the hash values of the first and second files are compared.

At block 410, the second file is determined to be a prefix of the first file if the two hash values are the same.

Figure 5:
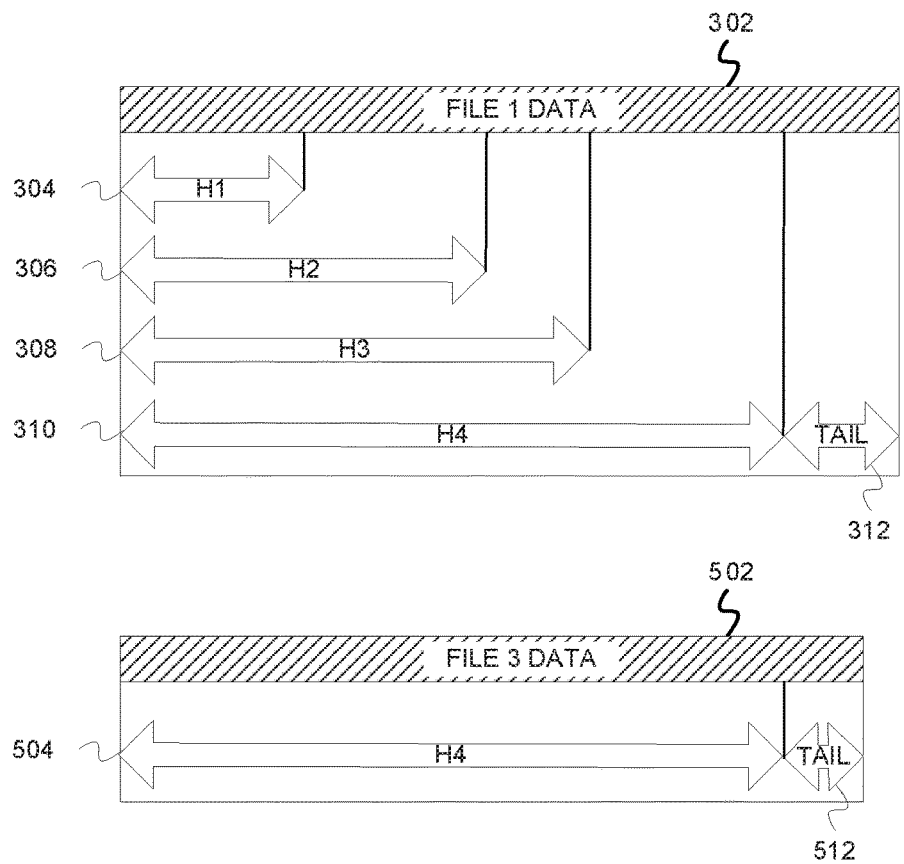
FIG. 5 provides an example prefix fingerprint for use in comparing against another file fingerprint.

FIG. 5 provides an example prefix fingerprint for use in comparing against another file fingerprint. For the purpose of the example, assume that a file 502 is being compared against file 302 of FIG. 3. Further assume that the coverage size of the hash values used to generate the prefix fingerprint for file 302 are as follows:

H1=1000
H2=2000
H3=2400
H4=3800

Further, the file size of file 502 is 3,825 bytes. Thus, in order to determine if file 502 is a prefix of file 302, a hash value H4 504 is generated from the data in file 502 that starts at the same offset as was used to generate hash value H4 310, and the data size used to generate hash value H4 504 is the same as that used to generate hash value H4 310. If the two hash values are the same, then file 502 is prefix of file 302. The precision of the comparison can be determined by as the size of H4/size of file 502. This calculation is 3800/3825=0.993, which means that the precision of the result is 99.3%.

In some aspects, the systems and methods of the disclosure can provide improved efficiency over previous methods. For example, the determination that a second file is a prefix of another file can be completed in a constant O(1) time in the case that the file fingerprint dataset is a simple hash table, and in O($\log_n$) time in the case that the file fingerprint dataset is a tree or sorted array.

As indicated above, the systems and methods of the disclosure can be used to determine if a second file is a prefix of a first file. In some aspects, the determination that a second file is a prefix of a first file is used in a determination that the second file is an incomplete download of the first file. Thus, the system and methods disclosed can increase the efficiency of the operation of a computing device by detecting that updates that can increase the functionality of performance of the computing system have not be completely downloaded.

In addition, the system and methods of the disclosure can be used to determine how much data is shared for two or more files from the beginning of the files.

Figure 6:
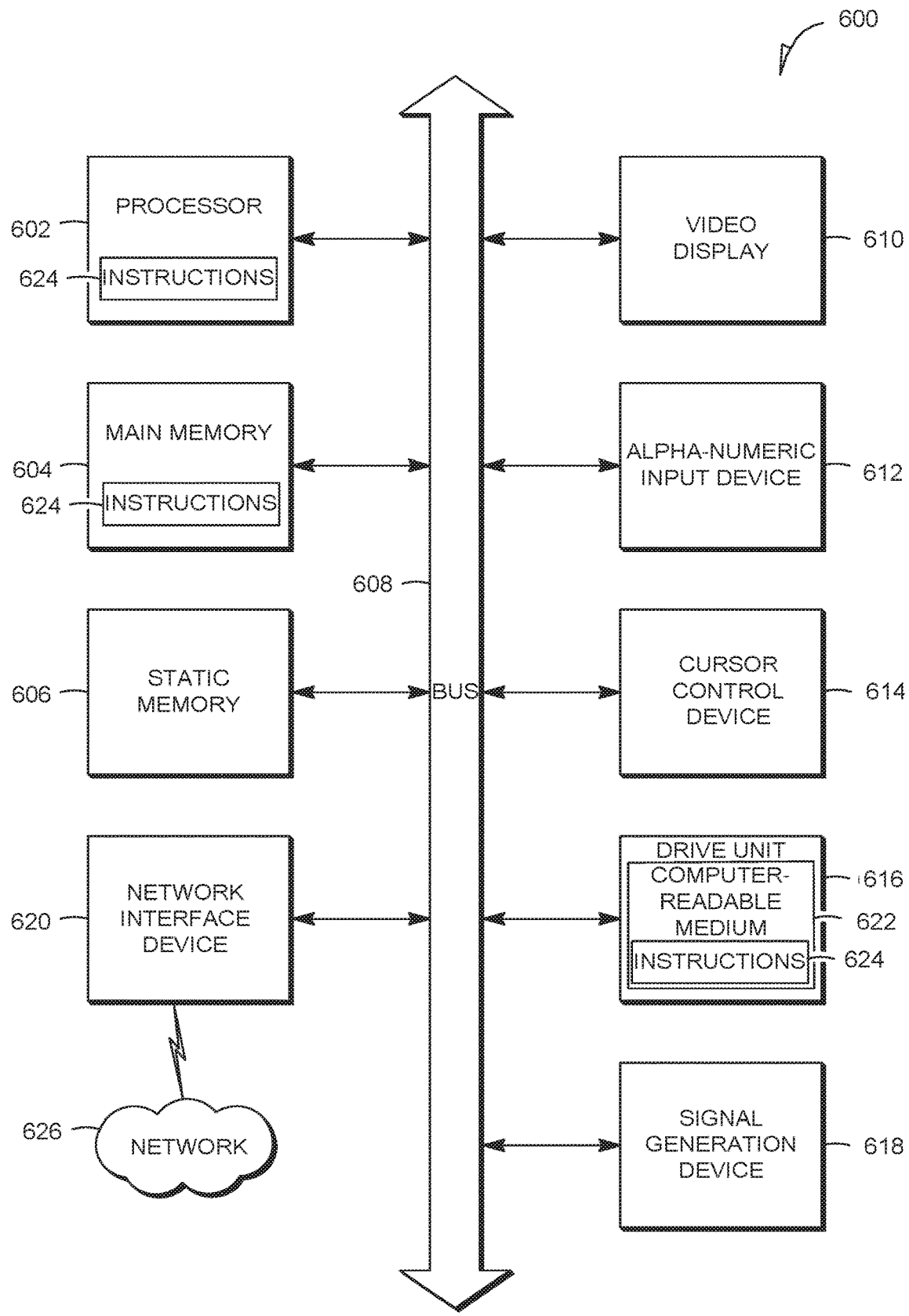
FIG. 6 is a block diagram of an example embodiment of a computer system upon which embodiments of the inventive subject matter can execute.

FIG. 6 is a block diagram of an example embodiment of computer system 600 upon which embodiments of the inventive subject matter can execute. The description of FIG. 6 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As set forth above, the system as disclosed herein can be spread across many physical hosts. Therefore, many systems and sub-systems of FIG. 6 can be involved in implementing the inventive subject matter disclosed herein.

Moreover, those skilled in the art will appreciate that the invention may be practiced with other computer system configurations, including hand-held devices, multiprocessor system, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

In aspects of the present invention described with reference to FIG. 6, an example embodiment extends to a machine in the example faint of a computer system 600 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alpha-numeric input device 612 (e.g., a keyboard), a user interface (UI) navigation device or cursor control device 614 (e.g., a mouse), a disk drive unit 616, a signal generation device 618 (e.g., a speaker), and a network interface device 620.

The disk drive unit 616 includes a machine-readable medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store info nation. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instruction 624 may further be transmitted or received over a communications networks 626 using a signal transmission medium via the network interface device 620 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Aspects of the present invention described herein with reference to flowchart illustration (e.g., FIG. 2 and FIG. 4) and block diagram (e.g., FIG. 1 and FIG. 6). It will be understood that each block of the flowchart illustrations and/or block diagrams may be provided to a processor (e.g., CPU 602 of FIG. 6, not shown in FIG. 1) of a general purpose computer or other non-transitory computer readable programmable data processing apparatus to produce a system or machine, which are carried out via the processor or the computer or other programmable data processing apparatus, create the functions.

Although an overview of the inventive subject matter has been described with reference to specific example embodiments, various modifications and changes may be made to these embodiments without departing from the broader sprit and scope of embodiments of the present invention. Such embodiments of inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for comparing files, the method comprising:
    comparing a first file with a second file, wherein a plurality of hash values are associated with a first prefix fingerprint for the first file, wherein the plurality of hash values were based on a plurality of data sections of the first file, the plurality of data sections having a same first beginning offset and different data sizes;
    selecting a first hash value from the first prefix fingerprint based, at least in part, on a size of the second file;
    generating a second hash value for the second file, the second hash value based on a data section of the second file, the data section of the second file having a second beginning offset equal to the first beginning offset and the same data size used to generate the first hash value in the first prefix fingerprint;
    a fingerprint dataset configured to store the first prefix fingerprint communicably coupled with a computing device, wherein the fingerprint dataset has a file identifier (ID) and the first prefix fingerprint has one or more hash values covering different sizes of data in the first file,
    wherein the fingerprint dataset is a hash table in order to determine whether the second file is a prefix of another file in a constant O(1) time;
    comparing the first hash value to the second hash value; and
    determining, based on the comparison, whether the second file is a prefix of the first file.

2. The method of claim 1 wherein the first beginning offset is zero.

3. The method of claim 1 further comprising indicating that the second file is an incomplete download of the first file in response to determining that the first hash value equals the second hash value.

4. The method of claim 1 wherein data sizes for successive hash values in the first prefix fingerprint increase in size.

5. A non-transitory computer readable storage medium having a program stored therein, the program causing a computer to execute:
    receiving a first file;
    generating a prefix fingerprint for the first file;

wherein the prefix fingerprint comprises one or more hash values calculated from a beginning offset value in the first file;

comparing the first file with a second file wherein a plurality of hash values are associate with the first prefix fingerprint for the first file, wherein the plurality of hash values are based on a plurality of data sections of the first file, the plurality of data sections having a same first beginning offset and different data sizes;

selecting a first hash value from the prefix fingerprint based, at least in part, on a size of the second file;

generating a second hash value for the second file, the second hash value based on a data section of the second file, the data section of the second file having a second beginning offset equal to the first beginning offset and the same data size used to generate the first hash value in the prefix fingerprint;

a fingerprint dataset storing the first prefix fingerprint communicably coupled with a computing device, wherein the fingerprint dataset has a file identifier (ID) and the first prefix fingerprint has one or more hash values covering different sizes of data in the first file, wherein the fingerprint dataset is a hash table in order to determine whether the second file is a prefix of another file in a constant O(1) time;

comparing the first hash value to the second hash value; and determining, based on the comparison, whether the second file is a prefix of the first file.

* * * * *